June 27, 1950  E. A. SPRIGG  2,513,115
CONNECTOR
Filed Dec. 3, 1945  2 Sheets-Sheet 1
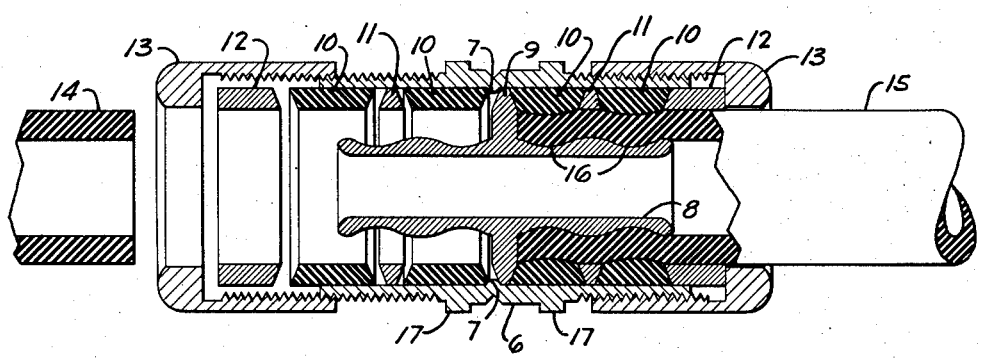
Fig. I
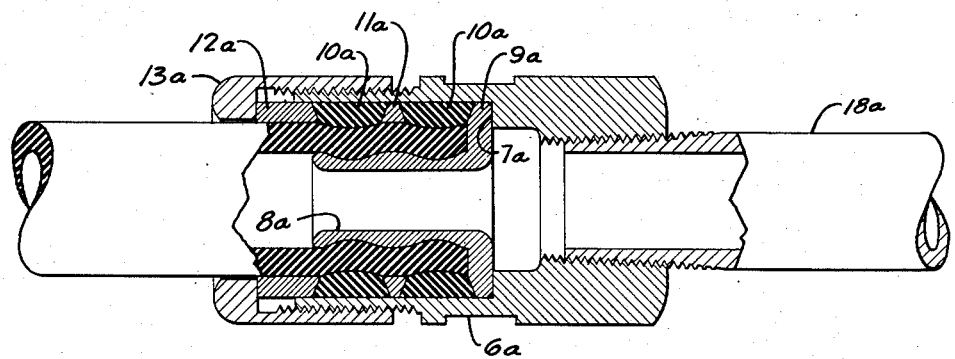
Fig. II
INVENTOR.
Edward A. Sprigg
BY
Marshall & Marshall
ATTORNEYS June 27, 1950  E. A. SPRIGG  2,513,115
CONNECTOR
Filed Dec. 3, 1945  2 Sheets-Sheet 2
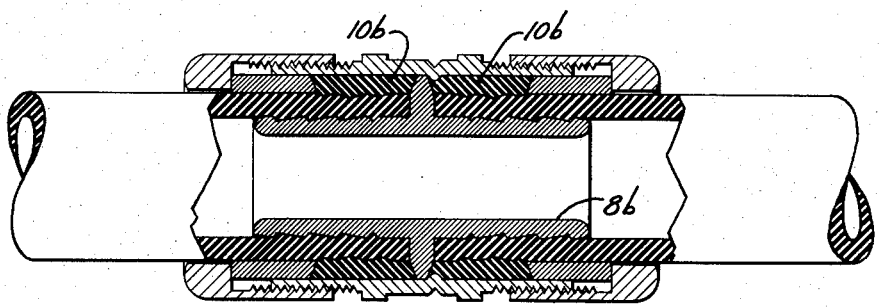
Fig. III
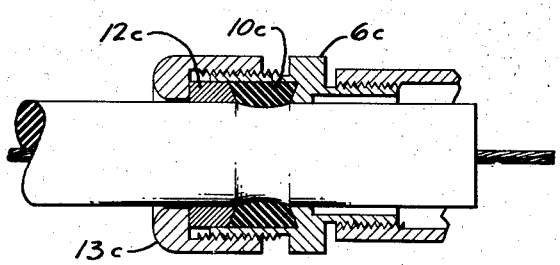
Fig. IV
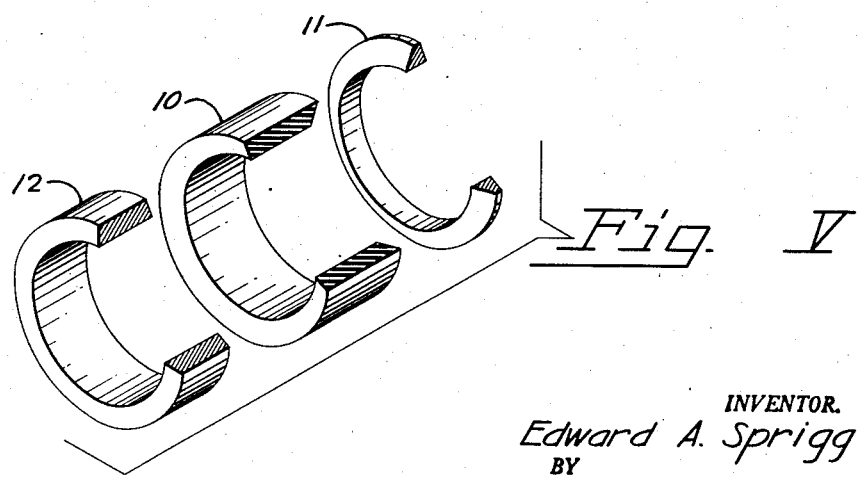
Fig. V
INVENTOR.
Edward A. Sprigg
BY
Marshall & Marshall
ATTORNEYS Patented June 27, 1950

2,513,115

UNITED STATES PATENT OFFICE 2,513,115

CONNECTOR

Edward A. Sprigg, Toledo, Ohio, assignor to H. H. Buggie & Company, Toledo, Ohio, a corporation of Ohio Application December 3, 1945, Serial No. 632,309

12 Claims. (Cl. 285—86)

This invention provides means for connecting hose, tubing, conduits and cables to valves, fittings, outlets and plugs, and for connecting pieces of hose, cable, or conduit together.

It is an object of the invention to provide hose, conduit and cable connecting means which not only is fluid tight but which so grips the hose, conduit, or cable to which it is applied as to prevent the connecting means from being pulled away until its gripping action is purposely relieved.

It is a further object of the invention to provide a connector capable of reliably gripping hose, conduit, or cable having exterior surfaces that are soft or liable to scarification, the connector being so organized that the function of gripping is performed without damage to such surfaces.

Still another object of the invention is to provide a connector having a gripping element which forms a fluid-tight seal around the exterior of any hose, conduit, or cable to which the connector is applied.

A specific but nonetheless important object of the invention is to provide a hose connector having a ferrule adapted to be inserted in the end of a hose and means for compressing the hose about the ferrule so as not only to prevent the hose and connector from being pulled apart but to form a fluid-tight seal between the interior of the hose and the ferrule as well as between the exterior of the hose and the compressing means.

Another specific but highly important object is to provide a connector having an improved form of grommet or packing ring with cooperating abutments and deforming means capable of achieving superior constricting action.

Other objects and advantages will be apparent from the following description, reference being had to the accompanying drawings in which several embodiments of the invention are illustrated so that the principles involved may be clearly understood, similar reference numerals being used to designate similar parts throughout the several views.

In the drawings:

Fig. I is a view in longitudinal section showing two hose ends, one of which has not yet been inserted into a connecting device embodying the instant invention in preferred form, the other hose end being inserted and secured.

Fig. II is a view in longitudinal section showing a hose end inserted and secured in a connector embodying the instant invention, the connector being fitted upon a pipe end.

Fig. III is a view in longitudinal section showing two hose ends connected by a so-called hose mender embodying the instant invention, the hose mender being of somewhat less expensive construction than the connecting device illustrated in Fig. I.

Fig. IV is a view in longitudinal section showing a cable end inserted and secured in a connector embodying the instant invention.

Fig. V is a view in enlarged perspective, with parts cut away, illustrating a grommet, a separator ring and a deformer ring, which are important elements of devices embodying the instant invention.

In the form of device illustrated in Fig. I, the connector comprises a metal shell 6 having a smooth cylindrical interior surface with bosses 7 protruding interiorly nearly midway between its ends, there being a metal ferrule 8 with a central flange 9 that substantially fits the interior of the shell 6 and is located against the bosses 7.

Also fitting within the shell 6 are four grommets 10 preferably made of soft rubber-like composition, such as neoprene, which is capable of elastic deformation but is substantially noncompressible. The sides of the grommets 10 are beveled, in the manner illustrated in Figs. I and V, so that the annular inside surfaces of the rings are narrower than the annular outside surfaces. The flange 9 is oppositely beveled to conform to the beveled edges of the grommets 10 that lie against the flange, and similarly beveled metal separator rings 11 lie between the pairs of grommets in each end of the shell 6.

At the ends of the shell 6 are metal deformer rings 12, the inside edges of which are beveled, as shown in Figs. I and V, to conform to the beveled edge of the grommets that they engage. The outside edges of the deformer rings may be plane or rounded, since these edges engage interior shoulders of metal nuts 13.

With the parts in the condition in which they are illustrated at the left side of Fig. I, the hose end 14 may be inserted through the nut 13 into the left end of the shell 6 and pushed between the grommets 10 and the ferrule 8. The parts at the right side of Fig. I are shown in their condition after the right nut 13 has been turned up to force the deformer ring 12 inwardly and squeeze the grommets 10 between the flange 9, the separator ring 11 and the deformer ring 12. When the grommets thus are squeezed they bulge inwardly and, being substantially noncompressible, exert hydrostatic-like force against the exterior of the hose end 15, which is thus clamped into shallow annular channel 16 formed about the ferrule 8. To facilitate turning, the nuts 13 may be knurled or provided with flat surfaces for engagement by a wrench, and ridges 17, surrounding the shell 6, similarly may be knurled or provided with flat surfaces. When the nuts 13 are turned back, the grommets 10 reassume the shape illustrated at the left side of Fig. I and the hose ends may be withdrawn.

It has been believed heretofore that encircling grommets would be forced inwardly more effectively if members between which the grommets were squeezed were shaped to have inwardly directed wedging action. The applicant has discovered that this belief is erroneous. The constriction of such grommets upon hose and the seal between the grommets and the hose and between the hose and the inner ferrule are not as good if the edges of the grommets, the sides of abutting flanges and the edges of the separator rings and the deformer rings are beveled in directions opposite from those in which they are shown to be beveled in Fig. I. It is of the greatest importance that the edges of the grommets and the cooperating edges of the flange, the separator rings and the deformer rings be beveled in the directions indicated in the accompanying drawings, so that the grommets will be confined between the squeezing members and hydrostatic-like forces most effectively set up.

Both the interior and the exterior seals in a connector of the form illustrated in Fig. I are so nearly perfect that not only is there no escape of fluid, but fluid does not reach the extreme end of the hose. Hose employed for handling some liquids, e. g. gasoline, usually is lined with material that is unaffected by liquid such as passes through the hose but the lining often is surrounded by a material which will swell and disintegrate if soaked by the liquid. If the liquid seeps into the extreme end of the hose, deterioration and ultimate failure may occur. The device of the applicant's invention prevents such deterioration and failure.

With the edges of the grommets and the members between which the grommets are squeezed beveled in the directions shown, hose ends varying considerably in outside diameter and wall thickness can be accommodated. The connector thus is self-adapting.

The left end of the connector illustrated in Fig. II is identical with the left end of the connector illustrated in Fig. I. The ferrule 8a has a flange 9a at its inner end which seats against the shoulder 7a formed within the shell 6a. The right end of the shell 6a is formed into a fitting which is threaded upon the end of a pipe 18a. The grommets 10a, the separator ring 11a, the deformer ring 12a and the nut 13a are identical with the corresponding elements of the device illustrated in Fig. I.

The hose mender illustrated in Fig. III differs from the connector illustrated in Fig. I in that the exterior of the ferrule 8b is merely rugated instead of being provided with smooth annular channels and in that two grommets 10b are employed instead of four, no separator rings being used. It is contemplated that devices such as illustrated in Fig. III would be lighter and less accurately made than devices such as illustrated in Fig. I.

The fact that connectors embodying the instant invention automatically adapt themselves to hose of varying outside diameters not only reduces the number of sizes that manufacturers and distributors need carry in stock, but it also obviates necessity of holding the dimensions of parts to close tolerances.

The cable connector illustrated in Fig. IV has no central ferrule, as the hydrostatic-like constriction by the grommet is exerted against the core of the cable. The shell 6c is formed with an interior shoulder which slopes in conformity with the beveled edge of the grommet 10c. The deformer ring 12c and the nut 13c are similar to the deformer rings and nuts of the hose connectors, though usually the dimensions of cable connector parts and the extent to which the grommets are deformed to grip the cables are somewhat less than is the case in hose connectors.

Cable connectors embodying the instant invention will accommodate cables varying considerably in diameter, the seals between the grommets and cables and between the grommets and the shells being fluid tight and the cables being gripped so tenaciously that delicate wires and soldered joints are not liable to damage by jerks or pulls to which the cables may be subjected. Notwithstanding the tenacity with which cables are held, they can be released readily by merely backing away the nut 13c.

The embodiments of the invention herein shown and described are to be regarded as illustrative only, and it is to be understood that the invention is susceptible to variation, modification and change within the spirit and scope of the subjoined claims.

Having described the invention, I claim:

1. In a device of the class described, in combination, a shell having a smooth cylindrical interior, annular gripping means fitted within said cylindrical interior, said annular gripping means being composed of soft substance capable of elastic deformation but substantially noncompressible, the sides of said annular gripping means being beveled inwardly so that the inside surfaces thereof are narrower than the outside surfaces, squeezing means having sides beveled to conform to and engage the beveled sides of said gripping means, and means for forcing said squeezing means against said gripping means to cause said gripping means to bulge inwardly with hydrostatic-like force.

2. In a device of the class described, in combination, a shell having a smooth cylindrical interior, an annular grommet fitting within said cylindrical interior, said grommet being composed of soft substantially noncompressible elastic substance, the sides of said grommet being beveled inwardly so that the inside surface of said grommet is narrower than the outside surface, squeezing means beveled to conform to the beveled sides of said grommet, and means for forcing said squeezing means against said grommet to cause said grommet to bulge inwardly with hydrostatic-like force for the purpose of gripping hose, cable, conduit, or the like.

3. In a device of the class described, in combination, a grommet composed of soft elastic substantially noncompressible material capable of being deformed under pressure to exert hydrostatic-like force, the sides of said grommet being beveled inwardly so that the inside surface of said grommet is narrower than its outside surface, means surrounding said grommet to prevent it from bulging outwardly, and means for squeezing said grommet axially to cause it to bulge inwardly, said squeezing means including annular members having sides beveled to conform to and engage the beveled sides of said grommet.

4. In a hose connector, in combination, a shell having a smooth cylindrical interior, stop means protruding inwardly from said smooth cylindrical interior, a ferrule having a centrally located flange engageable with said stop means for the purpose of locating said ferrule within said shell, grommets composed of soft elastic substantially non-compressible material fitting within said shell and spaced from said ferrule, deformer rings fitting within said shell and engageable with said grommets, and nuts having shoulders engageable with said deformer rings and having threaded engagement with said shell whereby said nuts may be turned to squeeze said grommets between said flange and said deformer rings and cause said grommets to bulge inwardly for the purpose of gripping a portion of hose surrounding said ferrule.

5. In a hose connector, in combination, a shell having a smooth cylindrical interior, bosses protruding inwardly from said smooth cylindrical interior, a ferrule having a centrally located flange engageable with said bosses for the purpose of locating said ferrule within said shell, grommets composed of soft elastic substantially noncompressible material fitting within said shell and spaced from said ferrule, deformer rings fitting within said shell and engageable with said grommets, and nuts having shoulders engageable with said deformer rings and having threaded engagement with said shell whereby said nuts may be turned to squeeze said grommets between said flange and said deformer rings and cause said grommets to bulge inwardly for the purpose of gripping a portion of hose surrounding said ferrule, the sides of said grommets being beveled inwardly toward each other and the sides of said flange and said deformer rings being beveled to conform to the beveled sides of said grommets.

6. In a device of the class described, in combination, a shell having a smooth cylindrical interior, a ferrule having shallow depressions in its exterior surface and having a flange fitting the cylindrical interior of said shell, means for axially locating said ferrule within said shell, grommet means fitting within said shell, and means for squeezing said grommet means axially and causing said grommet means to bulge toward the depressions in said ferrule whereby said grommet means may clamp into said depressions a portion of hose surrounding said ferrule.

7. In a device of the class described, in combination, a shell having a smooth cylindrical interior, a ferrule having a flange fitting such cylindrical interior, the exterior surface of said ferrule having annular depressions, grommets of soft deformable substantially noncompressible elastic substance fitting within the cylindrical interior of said shell, spacing rings separating said grommets, a deformer ring fitting the cylindrical interior of said shell and engageable with the outermost of said grommets, and a nut in threaded engagement with said shell and capable of being turned to force said deformer ring axially and thereby squeeze said grommets between said flange and said rings, thus causing said grommets to bulge inwardly, said grommets being so positioned that when so squeezed they will clamp portions of hose surrounding said ferrule into said annular depressions.

8. In a device of the class described, in combination, a shell, a ferrule centrally located within said shell and spaced therefrom, grommets fitted within said shell, there being shoulders within said shell to be engaged by the innermost of said grommets, spacing rings within said shell separating certain of said grommets, deformer rings entering said shell and engaging the outermost of said grommets, and nuts having shoulders engaging said deformer rings and capable of being turned to force said deformer rings axially and thereby squeeze said grommets, said grommets being composed of soft substantially noncompressible elastic material.

9. In a device of the class described, in combination, a shell, a ferrule centrally located within said shell and spaced therefrom, grommets fitted within said shell, there being shoulders within said shell to be engaged by the innermost of said grommets, spacing rings within said shell separating certain of said grommets, deformer rings entering said shell and engaging the outermost of said grommets, and nuts having shoulders engaging said deformer rings and capable of being turned to force said deformer rings axially and thereby squeeze said grommets, said grommets being composed of soft substantially noncompressible elastic material, the sides of said grommets being beveled inwardly toward each other and said shoulders and the sides of said rings which engage the sides of said grommets being beveled to conform thereto.

10. In a device of the class described, in combination, a shell, a ferrule centrally located within said shell and spaced therefrom, grommets fitted within said shell, there being shoulders within said shell to be engaged by the innermost of said grommets, spacing rings within said shell separating certain of said grommets, deformer rings entering said shell and engaging the outermost of said grommets, and nuts having shoulders engaging said deformer rings and capable of being turned to force said deformer rings axially and thereby squeeze said grommets, said grommets being composed of soft substantially noncompressible elastic material, the sides of said grommets being beveled inwardly toward each other and said shoulders and the sides of said rings which engage the sides of said grommets being beveled to conform thereto, the exterior surface of said ferrule having shallow annular depressions and said grommets when squeezed being so located that each grommet surrounds and bulges toward one of said annular depressions.

11. In a device of the class described, in combination, a shell, a ferrule centrally located within said shell and spaced therefrom, grommets fitted within said shell, there being shoulders within said shell to be engaged by the innermost of said grommets, deformer rings entering said shell and engaging the outermost of said grommets, and nuts having shoulders engaging said deformer rings and capable of being turned to force said deformer rings axially and thereby squeeze said grommets, said grommets being composed of soft substantially noncompressible elastic material, the sides of said grommets being beveled inwardly toward each other and said shoulders and the sides of said rings which engage the sides of said grommets being beveled to conform thereto.

12. In a device for connecting the ends of cylindrically shaped objects such as pipes, tubes, rods, conduits, and cables, in combination, a tubular shell having a smooth interior of a diameter substantially equal to the exterior diameter of the end of the object to be connected, at least one grommet fitting within said shell and around the end of the object to be connected, a substantially radially extending shoulder formed within said shell to limit movement of said grommet inwardly thereof, a deformer ring entering said shell and engaging the outermost edge of said grommet and a nut having an inner shoulder engaging said ring and being threaded on the exterior of said shell for forcing said ring inwardly thereby squeezing said grommet, said grommet being composed of soft substantially noncompressible elastic material, the sides of said grommet being beveled inwardly toward each other and said shoulder and the side of said ring which engages the sides of said grommet being beveled to conform thereto.

EDWARD A. SPRIGG.

REFERENCES CITED

The following references are of record in the file of this patent:

UNITED STATES PATENTS

| Number | Name | Date |
|---|---|---|
| 934,687 | Mueller | Sept. 21, 1909 |
| 1,063,926 | Schuermann | June 3, 1913 |
| 1,181,676 | Lambkin | May 2, 1916 |
| 1,682,339 | Hutchinson | Aug. 28, 1928 |
| 1,694,822 | Kennedy | Dec. 11, 1928 |
| 1,699,690 | Dake | Jan. 22, 1929 |
| 1,706,445 | Forney | Mar. 26, 1929 |
| 2,203,237 | Raybould | June 4, 1940 |

FOREIGN PATENTS

| Number | Country | Date |
|---|---|---|
| 162,222 | Switzerland | June 15, 1933 |